United States Patent
Liu et al.

(10) Patent No.: US 12,428,548 B2
(45) Date of Patent: Sep. 30, 2025

(54) UPGRADED POLYETHYLENE FOR JACKETING

(71) Applicant: Borealis AG, Vienna (AT)

(72) Inventors: Yi Liu, Linz (AT); Susanne Kahlen, Linz (AT); Hermann Braun, Linz (AT); Elisabeth Ribarits, Stenungsund (SE); Christian Goetzloff, Linz (AT)

(73) Assignee: Borealis AG, Vienna (AT)

( * ) Notice: Subject to any disclaimer, the term of this patent is extended or adjusted under 35 U.S.C. 154(b) by 461 days.

(21) Appl. No.: 17/924,707

(22) PCT Filed: May 17, 2021

(86) PCT No.: PCT/EP2021/062971
§ 371 (c)(1),
(2) Date: Nov. 11, 2022

(87) PCT Pub. No.: WO2021/233818
PCT Pub. Date: Nov. 25, 2021

(65) Prior Publication Data
US 2023/0242744 A1    Aug. 3, 2023

(30) Foreign Application Priority Data
May 20, 2020  (EP) .................................. 20175665

(51) Int. Cl.
*C08L 23/0807* (2025.01)
(52) U.S. Cl.
CPC ..... *C08L 23/0815* (2013.01); *C08L 2203/202* (2013.01); *C08L 2205/03* (2013.01); *C08L 2207/062* (2013.01); *C08L 2207/20* (2013.01)
(58) Field of Classification Search
None
See application file for complete search history.

(56) References Cited

U.S. PATENT DOCUMENTS

| | | | |
|---|---|---|---|
| 7,867,588 B2 | 1/2011 | Harris et al. | |
| 8,981,007 B2 | 3/2015 | Soon et al. | |
| 2008/0304797 A1* | 12/2008 | Castellani | C09D 123/06 385/100 |
| 2017/0107364 A1* | 4/2017 | Trolez | C08L 23/06 |

FOREIGN PATENT DOCUMENTS

| | | |
|---|---|---|
| CN | 1620476 A | 5/2005 |
| CN | 102643468 A | 8/2012 |
| CN | 107022139 A | 8/2017 |
| CN | 109456552 A | 3/2019 |
| DE | 102011108823 A1 | 1/2013 |
| EP | 1676283 B1 | 3/2009 |
| EP | 2417194 B1 | 3/2017 |
| TW | 201244904 A | 11/2012 |
| WO | 2016005265 A1 | 1/2016 |

OTHER PUBLICATIONS

Notification of Transmittal of the International Preliminary Report on Patentability for PCT/EP2021/062971 mailed Jul. 12, 2022, 15 pages.
Notification of Transmittal of the International Search Report and Written Opinion for PCT/EP2021/062971 mailed Jul. 13, 2021, 15 pages.
Extended European Search Report for Application No. 20175665.7 mailed Oct. 23, 2020, 12 pages.
Kurelec et al. "Strain hardening modulus as a measure of environmental stress crack resistance of high density polyethylene", Polymer 2005, 46 (17), 6369-6379.
Klimke, et al., "Optimisation and Application of Polyolefin Branch Quantification by Melt-State 13C NMR Spectroscopy," Macromolecular Chemistry and Physics, vol. 207, 2006, pp. 382-395.
Parkinson, et al., "Effect of Branch Length on 13C NMR Relaxation Properties in Moten Poly[ethylene-co-(x-olefin)] Model Systems," Macromolecular Chemistry and Physics, vol. 208, 2007, pp. 2128-2133.
Pollard, et al., "Observation of Chain Branching in Polyethylene in the Solid State and Melt via 13C NMR Spectroscopy and Melt NMR Relaxation Time Measurements," Macromolecules, vol. 37, 2004, pp. 813-825.
Filip, et al., "Heteronuclear decoupling under fast MAS by a rotor-synchronized Hahn-echo pulse train," Journal of Magnetic Resonance, vol. 176, 2005, pp. 239-243.
Griffin, et al., "Low-load Rotor-Synchronised Hahn-echo Pulso Train (RS-HEPT) 1H Decoupling in Solid-State NMR: factors affecting MAS Spin-echo Dephasing Times",. Magnetic Resonance in Chemistry, 2007; 45: S198-S208, Published online in Wiley Interscience.
Zhou, et al., "A new decoupling method for accurate quantification of polyethylene copolymer composition and triad sequence distribution with 13C NMR," Journal of Magnetic Resonance, vol. 187, 2007, pp. 225-233.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Singh, et al., "Triad Sequence Determination of Ethylene-Propylene Copolymers—Application of Quantitative 13C NMR," Polymer Testing, 2009, vol. 29, pp. 475-479.
Randall, et al., "A Review of High Resolution Liquid 13Carbon Nuclear Magnet Resonance Characterizations of Ethylene-Based Polymers", Rev. Macromol. Chem. Phys. 1989, C29, 201-317.
Heino et al., "Rheological Characterization of Polyethylene Fractions", Theoretical and Applied Rheology, Proc. XIth Int. Congr. on Rheology, Brussels, Belgium, Aug. 17-21, 1992, pp. 360-362.
Heino, et al., "The Influence of Molecular Structure on Some Rheological Properties of Polyethylene", Annual Transactions of the Nordic Rheology Society, 1995, pp. 71-73.

(Continued)

*Primary Examiner* — Christopher M Rodd
(74) *Attorney, Agent, or Firm* — Lowenstein Sandler LLP

(57) ABSTRACT

A mixed-plastic-polyethylene composition having a melt flow rate (ISO 1133, 2.16 kg, 190° C.) of from 0.1 to 0.9 g/10 min and a density of from 956 kg/m³ to 970 kg/m³ comprising recycled polyolefin.

16 Claims, No Drawings

(56) References Cited

OTHER PUBLICATIONS

Definition of terms relating to the non-ultimate mechanical properties of polymers, Pure & Appl. Chem. vol. 70, No. 3, pp. 701-754, 1998.
Castignolles, et al., "Detection and quantification of branching in polyacrylates by size-exclusion chromatography (SEC) and melt-state 13C NMR spectroscopy," Polymer, vol. 50, 2009, pp. 2373-2383.
Brandolini, et al. "NMR Spectra of Polymers and Polymers Additives", Marcel Dekker, Inc., 2000, 660 pages.

* cited by examiner

UPGRADED POLYETHYLENE FOR JACKETING

CROSS-REFERENCE TO RELATED APPLICATION(S)

The present application is a national stage entry under 35 U.S.C. § 371 of International Application No. PCT/EP2021/062971, filed on May 17, 2021, which claims priority to European Patent application Ser. No. 20175665.7, filed on May 20, 2020. The contents of these applications are hereby incorporated by reference in their entirety.

FIELD OF THE INVENTION

The present invention relates to upgrading of PE recycling streams using virgin high-density polyethylenes (HDPE) to give jacketing materials that have acceptable ESCR (Environmental Stress Crack Resistance) performance.

BACKGROUND

Polyolefins, in particular polyethylene and polypropylene are increasingly consumed in large amounts in a wide range of applications, including packaging for food and other goods, fibres, automotive components, and a great variety of manufactured articles.

Polyethylene based materials are a particular problem as these materials are extensively used in packaging. Taking into account the huge amount of waste collected compared to the amount of waste recycled back into the stream, there is still a great potential for intelligent reuse of plastic waste streams and for mechanical recycling of plastic wastes.

Generally, recycled quantities of polypropylene on the market are mixtures of both polypropylene (PP) and polyethylene (PE), this is especially true for post-consumer waste streams. Moreover, commercial recyclates from post-consumer waste sources are conventionally cross contaminated with non-polyolefin materials, such as polyethylene terephthalate, polyamide, polystyrene or non-polymeric substances like wood, paper, glass or aluminium. These cross-contaminations drastically limit final applications or recycling streams such that no profitable final uses remain.

In addition, recycled polyolefin materials normally have properties, which are much worse than those of the virgin materials, unless the amount of recycled polyolefin added to the final compound is extremely low. For example, such materials often have limited impact strength and poor mechanical properties (such as e.g. brittleness) and thus, they do not fulfil customer requirements. For several applications, e.g. jacketing materials (for cables), containers, automotive components or household articles. This normally excludes the application of recycled materials for high quality parts, and means that they are only used in low-cost, non-demanding applications, such as e.g. in construction or in furniture. In order to improve the mechanical properties of these recycled materials, generally relatively large amounts of virgin materials (produced from oil) are added.

U.S. Pat. No. 8,981,007 B2 relates to non-crosslinked polyethylene compositions for use in the jacketing of power cables. Generally crosslinked polyethylene is used for power cables, due to its excellent heat resistance, chemical resistance and electrical properties. However, since crosslinked polyethylene resin is a thermoset resin, it is not recyclable. There is, therefore, a demand for an eco-friendly non-crosslinked type thermoplastic polyethylene resin, which is also heat resistant and hence suitable for use in power cables.

EP 2417194 B1 also relates to uncrosslinked polyethylene compositions for use in power cables. The compositions disclosed herein are polymer blends comprising MDPE and HDPE and one or more additive(s) selected from a flame retardant, an oxidation stabilizer, a UV stabilizer, a heat stabilizer and a process aid.

DE-102011108823-A1 relates to a composite for the electrical isolation of electrical cables. The composite comprises a plastic, a material having a heat conductivity of less than 1 W/(mk) and a displacement material (C). In certain embodiments, the displacement material can be a recycled material.

EP 1676283 B1 relates to medium/high voltage electrical energy transport or distribution cables comprising at least one transmissive element and at least one coating layer, said coating layer being made from a coating material comprising at least one recycled polyethylene (obtained from a waste material) with a density not higher than 0.940 g/cm$^3$ and at least a second polyethylene material having a density higher than 0.940 g/cm$^3$. The coating material in some of the examples of EP 1676283 B1 showed improved values with respect to stress cracking resistance with respect to those obtained from recycled polyethylene alone. However, these values were considerably lower than those obtained with the virgin material.

A particular problem in recycled polyethylene materials is that ESCR (Environmental Stress Crack Resistance) properties are inacceptable depending on the waste origin. ESCR can be evaluated with a number of parameters including the failure time of Bell test and strain hardening modulus, i.e., the slope of the strain hardening part of a stress-strain curve (Kurelec, L.; Teeuwen, M.; Schoffeleers, H.; Deblieck, R., Strain hardening modulus as a measure of environmental stress crack resistance of high density polyethylene. Polymer 2005, 46 (17), 6369-6379). Thus, there is need for addressing these limitations in a flexible way. For jacketing applications, an ESCR Bell test failure time of >500 hours is generally desirable.

Thus, there remains a need in the art to provide recycled polyethylene solutions for jacketing materials that have acceptable and constant ESCR (Environmental Stress Crack Resistance) performance, with Bell test failure time>1000 hours, preferably >2000 hours with other properties (e.g. tensile properties) as well as acceptable or even good strain hardening modulus which are similar to blends of virgin polyethylene and carbon black marketed for the purpose of cable jacketing.

SUMMARY OF THE INVENTION

In the broadest aspect the present invention provides
a mixed-plastic-polyethylene composition
having
   a melt flow rate (ISO 1133, 2.16 kg, 190° C.) of from 0.1 to 0.9 g/10 min;
   a density of from 956 kg/m$^3$ to 970 kg/m$^3$,
the mixed-plastic-polyethylene composition comprising
   a total amount of ethylene units (C2 units) of from 87.0 to 97.0 wt.-%, and
   a total amount of continuous units having 3 carbon atoms corresponding to polypropylene (continuous C3 units) of from 1.0 to 12.0 wt.-%,
   a total amount of units having 4 carbon atoms (C4 units) of from 1.75 wt.-% to 2.25 wt.-%, with the total amounts of C2 units, continuous C3 units and units having 4 carbon atoms being based on the total weight amount of monomer units in the composition and measured according to quantitative $^{13}C\{^1H\}$ NMR measurement; whereby the mixed-plastic-polyethylene composition comprises a mixed-plastic polyethylene primary recycling blend (A).

The present invention is based on the surprising finding that very good ESCR and strain hardening performance is obtained when the total amount of ethylene units (C2 units) is from 90.0 to 96.0 wt.-%, measured according to quantitative $^{13}C\{^1H\}$ NMR measurement, the total amount of units having 4 carbon atoms (C4 units) is from 1.75 wt.-% to 2.25 wt.-%, and when the total amount of continuous units having 3 carbon atoms corresponding to polypropylene (continuous C3 units) is from 2.5 to 7.0 wt.-%, preferably 2.5 to 6.0 wt.-%.

The present invention provides a compositions with good ESCR performance (Bell test failure time>1000 hours, more preferably >2000 hours and good strain hardening range, while maintaining other properties similar to blends of virgin polyethylene and carbon black marketed for the purpose of cable jacketing.

The present invention provides a mixed-plastic-polyethylene composition having a melt flow rate (ISO 1133, 2.16 kg, 190° C.) of from 0.1 to 0.9 g/10 min;

a density of from 956 kg/m³ to 968 kg/m³, preferably from 958 to 968 kg/m³; and more preferably from 960 to 966 kg/m³;

the mixed-plastic-polyethylene composition comprising a total amount of ethylene units (C2 units) of from 90.0 to 96.0 wt.-%, and a total amount of continuous units having 3 carbon atoms corresponding to polypropylene (continuous C3 units) of from 1.0 to 7.0 wt.-%, preferably 2.5 to 6.0 wt.-%, a total amount of units having 4 carbon atoms (C4 units) of from 1.75 wt.-% to 2.20 wt.-%, preferably 1.75 wt.-% to 2.20 wt.-%, more preferably from 1.75 wt.-% to 2.15 wt.-%, still more preferably from 1.80 wt.-% to 2.10 wt.-%;

with the total amounts of C2 units, continuous C3 units and units having 4 carbon atoms being based on the total weight amount of monomer units in the composition and measured according to quantitative $^{13}C\{^1H\}$ NMR measurement.

The mixed-plastic-polyethylene composition according to the present invention is obtainable by blending and extruding a. 5.0 to 35.0 wt.-% of a mixed-plastic-polyethylene primary recycling blend (A), wherein 90.0 wt.-%, preferably 95.0 wt.-%, more preferably 100.0 wt.-% of the mixed-plastic-polyethylene primary blend (A) originates from post-consumer waste having a limonene content of from 0.10 to 500 ppm; and wherein the mixed-plastic-polyethylene primary blend (A) has a melt flow rate (ISO 1133, 2.16 kg, 190° C.) of from 0.1 to 1.5 g/10 min, preferably from 0.4 to 1.3 g/10 min, a density of from 945 to 990 kg/m³, optionally a shear thinning index $SHI_{2.7/210}$ of 30 to 60, preferably 35 to 50 optionally a polydispersity index from 1.2 to 2.5 s$^{-1}$, preferably 1.6 to 2.2 s$^{-1}$, as obtained from rheological measurement, and a content of units derived from ethylene of 70.0 to 95.0 wt.-% as determined by quantitative $^{13}C\{^1H\}$-NMR, b. 65.0 to 95.0 wt.-% of a secondary component (B) being a virgin high-density polyethylene (HDPE) optionally blended with carbon black, the secondary component (B) having a melt flow rate (ISO 1133, 2.16 kg, 190° C.) of from 0.1 to 1.2 g/10 min, preferably from 0.3 to 0.7 g/10 min;

a density of from 940 to 970 kg/m³, preferably from 955 to 970 kg/m³, a shear thinning index $SHI_{2.7/210}$ of 15 to 30 a polydispersity index from 1.6 to 2.2 s$^{-1}$ as obtained from rheological measurement, optionally a carbon black content of 1.5 to 3.0 wt.-% with respect to the secondary component (B), and preferably a limonene content below 0.10 ppm.

The invention is further directed to an article, comprising the mixed-plastic-polyethylene composition of the present invention, preferably wherein the article is a cable jacket.

Also provided is a process for preparing the mixed-plastic-polyethylene composition of the invention, comprising the steps of:

a. providing a mixed-plastic-polyethylene primary recycling blend (A) in an amount of 5.0 to 35.0 wt.-% based on the overall weight of the composition, wherein 90.0 wt.-%, preferably 95.0 wt.-%, more preferably 100.0 wt.-% of the mixed-plastic-polyethylene primary blend (A) originates from post-consumer waste having a limonene content of from 0.10 to 500 ppm and wherein the mixed-plastic-polyethylene primary blend has a melt flow rate (ISO 1133, 2.16 kg, 190° C.) of from 0.1 to 1.5 g/10 min, preferably from 0.4 to 1.3 g/10 min, a density of from 945 to 990 kg/m³, optionally a shear thinning index $SHI_{2.7/210}$ of 35 to 50 optionally a polydispersity index from 1.2 to 2.5 s$^{-1}$, 1.6 to 2.2 s$^{-1}$ as obtained from rheological measurement, and a content of units derived from ethylene of 70.0 to 95.0 wt.-% as determined by quantitative $^{13}C\{^1H\}$-NMR, b. providing a secondary component (B) being a virgin high-density polyethylene (HDPE) optionally blended with carbon black, in an amount of 65.0 to 95.0 wt.-% based on the overall weight of the composition, the secondary component (B) having i. a melt flow rate (ISO 1133, 2.16 kg, 190° C.) of from 0.1 to 1.2 g/10 min, preferably from 0.3 to 0.7 g/10 min;

ii. a density of from 940 to 970 kg/m³, preferably from 955 to 970 kg/m³, iii. a shear thinning index $SHI_{2.7/210}$ of 15 to 30 iv. a polydispersity index from 1.6 to 2.2 s$^{-1}$ as obtained from rheological measurement, v. optionally a carbon black content of 1.5 to 3.0 wt.-% with respect to the secondary component (B); and vi. preferably, a limonene content below 0.10 ppm.

c. melting and mixing the blend of mixed-plastic-polyethylene primary blend (A) and the secondary component (B) in an extruder, optionally a twin screw extruder, and d. optionally pelletizing the obtained mixed-plastic-polyethylene composition.

Unless defined otherwise, all technical and scientific terms used herein have the same meaning as commonly understood by one of ordinary skill in the art to which the invention pertains. Although, any methods and materials similar or equivalent to those described herein can be used in practice for testing of the present invention, the preferred materials and methods are described herein. In describing and claiming the present invention, the following terminology will be used in accordance with the definitions set out below.

Unless clearly indicated otherwise, use of the terms "a," "an," and the like refers to one or more.

For the purposes of the present description and of the subsequent claims, the term "recycled waste" is used to indicate a material recovered from both post-consumer waste, as opposed to virgin polymers and/or materials. Post-consumer waste refers to objects having completed at least a first use cycle (or life cycle), i.e. having already served their first purpose.

The term "virgin" denotes the newly produced materials and/or objects prior to their first use, which have not already been recycled. The term "recycled material" such as used herein denotes materials reprocessed from "recycled waste".

The term "natural" in the context of the present invention means that the components are of natural colour. This means that no pigments (including carbon black) are included in the components of the mixed-plastic-polyethylene composition of the present invention.

A blend denotes a mixture of two or more components, wherein one of the components is polymeric. In general, the blend can be prepared by mixing the two or more components. Suitable mixing procedures are known in the art. The secondary component (B) may be a blend comprising at least 90 wt.-% of a reactor made high density polyethylene material, as well as carbon black. This high density polyethylene material is a virgin material which has not already been recycled.

For the purposes of the present description and of the subsequent claims, the term "mixed-plastic-polyethylene" indicates a polymer material including predominantly units derived from ethylene apart from other polymeric ingredients of arbitrary nature. Such polymeric ingredients may for example originate from monomer units derived from alpha olefins such as propylene, butylene, octene, and the like, styrene derivatives such as vinylstyrene, substituted and unsubstituted acrylates, substituted and unsubstituted methacrylates.

Said polymeric materials can be identified in the mixed-plastic polyethylene composition by means of quantitative $^{13}C\{^1H\}$ NMR measurements as described herein. In the quantitative $^{13}C\{^1H\}$ NMR measurement used herein and described below in the measurement methods different units in the polymeric chain can be distinguished and quantified. These units are ethylene units (C2 units), units having 3, 4 and 6 carbons and units having 7 carbon atoms.

Thereby, the units having 3 carbon atoms (C3 units) can be distinguished in the NMR spectrum as isolated C3 units (isolated C3 units) and as continuous C3 units (continuous C3 units) which indicate that the polymeric material contains a propylene based polymer. These continuous C3 units can also be identified as iPP units. The continuous C3 units thereby can be distinctively attributed to the mixed-plastic-polyethylene primary recycling blend (A) as the secondary component (B) in the mixed-plastic-polyethylene composition according to the present invention usually does not include any propylene based polymeric components.

The units having 3, 4, 6 and 7 carbon atoms describe units in the NMR spectrum which are derived from two carbon atoms in the main chain of the polymer and a short side chain or branch of 1 carbon atom (isolated C3 unit), 2 carbon atoms (C4 units), 4 carbon atoms (C6 units) or 5 carbon atoms (C7 units).

The units having 3, 4 and 6 carbon atoms (isolated C3, C4 and C6 units) can derive either from incorporated comonomers (propylene, 1-butene and 1-hexene comonomers) or from short chain branches formed by radical polymerization.

The units having 7 carbon atoms (C7 units) can be distinctively attributed to the mixed-plastic-polyethylene primary recycling blend (A) as they cannot derive from any comonomers. 1-heptene monomers are not used in copolymerization. Instead, the C7 units represent presence of LDPE distinct for the recyclate. It has been found that in LDPE resins the amount of C7 units is always in a distinct range. Thus, the amount of C7 units measured by quantitative $^{13}C\{^1H\}$ NMR measurements can be used to calculate the amount of LDPE in a polyethylene composition.

Thus, the amounts of continuous C3 units, isolated C3 units, C4 units, C6 units and C7 units are measured by quantitative $^{13}C\{^1H\}$ NMR measurements as described below, whereas the amount of LDPE is calculated from the amount of C7 units as described below.

The total amount of ethylene units (C2 units) is attributed to units in the polymer chain, which do not have short side chains of 1-5 carbon atoms, in addition to the units attributed to the LDPE (i.e. units which have longer side chains branches of 6 or more carbon atoms).

A mixed-plastic-polyethylene primary recycling blend (A) denotes the starting primary blend containing the mixed plastic-polyethylene as described above. Conventionally further components such as filers, including organic and inorganic fillers for example talc, chalk, carbon black, and further pigments such as $TiO_2$ as well as paper and cellulose may be present. According to the present invention, the waste stream is a consumer waste stream, such a waste stream may originate from conventional collecting systems such as those implemented in the European Union. Post-consumer waste material is characterized by a limonene content of from 0.10 to 500 ppm (as determined using solid phase microextraction (HS-SPME-GC-MS) by standard addition).

Mixed-plastic-polyethylene primary blend(s) (A) as used herein are commercially available. Suitable blends include a number of recyclates available from Mtm plastics under the brand name Purpolen.

Within the meaning of this invention the term "jacketing materials" refers to materials used in cable jacketing/cable coating applications for electrical/telephone/telecommunications cables. These materials are required to show good ESCR properties, such as a Bell test failure time of >1000 hours.

If not indicated otherwise "%" refers to weight-%.

DETAILED DESCRIPTION

Natural Mixed-Plastic-Polyethylene Primary Recycling Blend (A)

The mixed-plastic-polyethylene composition according to the present invention comprises a mixed-plastic-polyethylene primary recycling blend (A). It is the essence of the present invention that this primary recycling blend is obtained from a post-consumer waste stream.

According to the present invention the mixed-plastic-polyethylene primary recycling blend (A) is generally a blend, wherein at least 90.0 wt.-%, preferably at least 95.0 wt.-%, more preferably 100.0 wt.-% of the mixed-plastic-polyethylene primary blend originates from post-consumer waste, such as from conventional collecting systems (curbside collection), such as those implemented in the European Union.

Said post-consumer waste can be identified by its limonene content. It is preferred that the post-consumer waste has a limonene content of from 0.10 to 500 ppm.

The mixed-plastic-polyethylene primary recycling blend (A) preferably comprises a total amount of ethylene units (C2 units) of from 70.0 wt.-% to 95.0 wt.-%, more preferably of from 71.5 wt.-% to 92.0 wt.-%, still more preferably of from 73.0 wt.-% to 90.0 wt.-% and most preferably of from 74.0 wt.-% to 88.0 wt.-%.

The total amounts of C2 units are based on the total weight amount of monomer units in the mixed-plastic-polyethylene primary recycling blend (A) and are measured according to quantitative $^{13}C\{^1H\}$ NMR measurement.

The mixed-plastic-polyethylene primary recycling blend (A) preferably further comprises a total amount of continuous units having 3 carbon atoms corresponding to polypropylene (continuous C3 units) of from 4.0 to 30.0 wt.-%, more preferably from 7.0 wt.-% to 28.0 wt.-%, still more preferably from 9.0 wt.-% to 26.5 wt.-% and most preferably from 11.0 wt.-% to 25.5 wt.-%.

In addition to C2 units and continuous C3 units the mixed-plastic-polyethylene primary recycling blend (A) can further comprise units having 3, 4, 6 or 7 or more carbon atoms so that the mixed-plastic-polyethylene primary recycling blend (A) overall can comprise ethylene units and a mix of units having 3, 4, 6 and 7 or more carbon atoms.

The mixed-plastic-polyethylene primary recycling blend (A) preferably comprises one or more in any combination, preferably all of:
    a total amount of units having 3 carbon atoms as isolated C3 units (isolated C3 units) of from 0.01 wt.-% to 0.50 wt.-%, more preferably from 0.05 wt.-% to 0.45 wt.-%, still more preferably from 0.10 wt.-% to 0.40 wt.-% and most preferably from 0.15 wt.-% to 0.35 wt.-%;
    a total amount of units having 4 carbon atoms (C4 units) of from 0.01 to 0.60 wt.-%, more preferably from 0.05 wt.-% to 0.50 wt.-%, still more preferably from 0.10 wt.-% to 0.45 wt.-% and most preferably from 0.20 wt.-% to 0.40 wt.-%;
    a total amount of units having 6 carbon atoms (C6 units) of from 0.01 to 1.00 wt.-%, more preferably from 0.05 wt.-% to 0.80 wt.-%, still more preferably from 0.10 wt.-% to 0.60 wt.-% and most preferably from 0.15 wt.-% to 0.50 wt.-%; and
    a total amount of units having 7 carbon atoms (C7 units) of from 0.00 wt.-% to 0.50 wt.-%, of from 0.00 wt.-% to 0.20 wt.-%, still more preferably of from 0.00 to 0.10 wt.-% yet more preferably of from 0.00 wt.-% to 0.05 wt.-%, most preferably there are is no measureable content of units having 7 carbon atoms (C7 units).

The total amounts of C2 units, continuous C3 units, isolated C3 units, C4 units, C6 units and C7 units thereby are based on the total weight amount of monomer units in the mixed-plastic-polyethylene primary recycling blend (A) and are measured or calculated according to quantitative $^{13}C\{^1H\}$ NMR measurement.

Preferably, the total amount of units, which can be attributed to comonomers (i.e. isolated C3 units, C4 units, C6 units and C7 units), in the mixed-plastic-polyethylene primary recycling blend (A) is from 0.10 wt.-% to 2.00 wt.-%, more preferably from 0.20 wt.-% to 1.70 wt.-%, still more preferably from 0.25 wt.-% to 1.40 wt.-% and most preferably from 0.30 wt.-% to 1.20 wt.-%, and is measured according to quantitative $^{13}C\{^1H\}$ NMR measurement.

It is preferred that the mixed-plastic-polyethylene primary recycling blend (A) has
    a melt flow rate (ISO 1133, 2.16 kg, 190° C.) of from 0.1 to 1.5 g/10 min, more preferably from 0.4 to 1.3 g/10 min; and/or
    a density of from 945 to 990 kg/m$^3$, more preferably from 948 to 987 kg/m$^3$, most preferably from 950 to 985 kg/m$^3$.

The mixed-plastic-polyethylene primary recycling blend (A) may also include:
    a) 0 to 10.0 wt.-% units derived from olefin(s) containing functional groups,
    b) 0 to 3.0 wt.-% stabilizers,
    c) 0 to 3.0 wt.-% talc,
    d) 0 to 3.0 wt.-% chalk,
    e) 0 to 3.0 wt.-% TiO$_2$, and
    f) 0 to 6.0 wt.-% further components
all percentages with respect to the mixed-plastic-polyethylene primary recycling blend (A).

The mixed-plastic-polyethylene primary recycling blend (A) preferably has one or more, more preferably all, of the following properties in any combination:
    a melt flow rate (ISO 1133, 5.0 kg, 190° C.) of from 2.0 to 6.0 g/10 min, more preferably from 3.0 to 5.0 g/10 min;
    a melt flow rate (ISO 1133, 21.6 kg, 190° C.) of from 50.0 to 120.0 g/10 min, more preferably from 70.0 to 100.0 g/10 min;
    a polydispersity index PI of from 1.2 to 2.5 s$^{-1}$, more preferably 1.6 to 2.2 s$^{-1}$, yet more preferably from 1.7 to 2.1 s$^{-1}$;
    a shear thinning index SHI$_{2.7/210}$ of from 30 to 60, more preferably 35 to 50, yet more preferably from 38 to 47;
    a complex viscosity at the frequency of 300 rad/s, eta$_{300}$, of from 450 to 700 Pa·s, more preferably from 500 to 650 Pa·s;
    a complex viscosity at the frequency of 0.05 rad/s, eta$_{0.05}$, of from 20000 to 40000 Pa·s, more preferably from 25000 to 35000 Pa·s;
    a xylene hot insoluble content, XHU, of from 0.01 to 1.0 wt.-%, more preferably from 0.1 to 0.5 wt.-%, and/or
    a limonene content of from 0.10 to 500 ppm.

Generally, recycled materials perform less well in functional tests such as the ESCR (Bell test failure time), SH modulus and Shore D tests than virgin materials or blends comprising virgin materials. Usually ESCR (Bell test failure time) properties are completely inacceptable, i.e. the test cannot be carried out because the performance is disastrous.

The mixed-plastic-polyethylene primary recycling blend (A) is preferably present in the composition of the present invention in an amount of from 5.0 to 35.0 wt.-%, further preferably 10.0 to 33.0 wt.-%, still more preferably from 15.0 to 31.0 wt.-%, and most preferably from 20.0 to 30.0 wt.-%, based on the overall weight of the composition.

Secondary Component (B)

The mixed-plastic-polyethylene composition of the invention comprises a secondary component (B) being a virgin high-density polyethylene (HDPE) optionally blended with carbon black (CB).

The secondary component (B) preferably has:
    a melt flow rate (ISO 1133, 2.16 kg, 190° C.) of from 0.1 to 1.2 g/10 min, preferably from 0.3 to 0.7 g/10 min; and/or a density of from 940 to 970 kg/m³, more preferably 955 to 970 kg/m³, yet more preferably from 959 to 967 kg/m³; and/or a polydispersity index from 1.6 to 2.2 s⁻¹, more preferably from 1.8 to 2.1 s⁻¹, a shear thinning index $SHI_{2.7/210}$ of 15 to 30, more preferably 20 to 27, optionally a carbon black content of 1.5 to 3.0 wt.-%, with respect to the secondary component (B), more preferably of 1.8 to 2.8 wt.-%, and a limonene content below 0.10 ppm.

The secondary component (B) includes as polymeric component a copolymer of ethylene and one or more comonomer units selected from alpha-olefins having from 3 to 6 carbon atoms. It is preferred that the polymeric component is a copolymer of ethylene and 1-butene or a copolymer of ethylene and 1-hexene.

Apart from the polymeric component the secondary component (B) can further comprise additives in an amount of 10 wt.-% or below, more preferably 9 wt.-% or below, more preferably 7 wt.-% or below of the secondary component (B). Suitable additives are usual additives for utilization with polyolefins, such as stabilizers (e.g. antioxidant agents), metal scavengers and/or UV-stabilizers, antistatic agents and utilization agents (such as processing aid agents).

The secondary component (B) preferably has one or more, more preferably all of the following properties in any combination:

a melt flow rate (ISO 1133, 5.0 kg, 190° C.) of from 1.0 to 5.0 g/10 min, more preferably from 1.3 to 3.0 g/10 min;

a melt flow rate (ISO 1133, 21.6 kg, 190° C.) of from 20.0 to 50.0 g/10 min, more preferably from 25.0 to 40.0 g/10 min;

a complex viscosity at the frequency of 300 rad/s, $eta_{300}$, of from 500 to 900 Pa·s, more preferably from 600 to 850 Pa·s;

a complex viscosity at the frequency of 0.05 rad/s, $eta_{0.05}$, of from 15000 to 30000 Pa s, more preferably from 17500 to 27500 Pa·s;

a Shore D hardness, measured after 15 s according to ISO 868, Shore D 15 s, of from 50.0 to 70.0, more preferably of from 55.0 to 65.0, a Shore D hardness, measured after 1 s according to ISO 868, Shore D 1 s, of from 55.0 to 75.0, more preferably of from 58.0 to 70.0, a Shore D hardness, measured after 3 s according to ISO 868, Shore D 3 s, of from 55.0 to 75.0, more preferably of from 58.0 to 70.0, a strain hardening modulus, SH modulus, of from 20.0 to 35.0 MPa, more preferably from 22.5 to 32.5 MPa, a Charpy notched impact strength at 23° C., Charpy NIS 23° C., of from 8.0 to 20.0 kJ/m², more preferably from 10.0 to 17.5 kJ/m², a Charpy notched impact strength at 0° C., Charpy NIS 0° C., of from 4.0 to 15.0 kJ/m², more preferably from 6.0 to 12.5 kJ/m², a tensile stress at break of from 25 to 50 MPa, more preferably from 28 to 40 MPa, a tensile strain at break of from 700 to 1000%, more preferably from 800 to 950%, an environmental stress crack resistance, ESCR, of at least 2500 hours, more preferably at least 3000 hours.

Generally, recycled materials perform less well in functional tests such as the ESCR (Bell test failure time), SH modulus and Shore D tests than virgin materials or blends comprising virgin materials.

The secondary component (B) is preferably present in the composition of the present invention in an amount of from 65.0 to 95.0 wt.-%, further preferably 67.0 to 90.0 wt.-%, still more preferably from 69.0 to 85.0 wt.-%, and most preferably from 70.0 to 80.0 wt.-%, based on the overall weight of the composition.

The secondary component (B) preferably contains carbon black in and amount of 1.5 to 3.0 wt.-%, with respect to the secondary component (B), more preferably of 1.8 to 2.8 wt.-% and most preferably 2.0 to 2.8 wt.-%.

Mixed-Plastic-Polyethylene Composition

The present invention seeks to provide a mixed-plastic-polyethylene composition comprising a mixed-plastic-polyethylene primary recycling blend (A) with improved ESCR, impact strength and SH modulus compared to the mixed-plastic-polyethylene primary recycling blend (A), to levels which are suitable for jacketing applications.

The mixed-plastic-polyethylene composition as described herein is especially suitable for wire and cable applications, such as jacketing applications.

In a first aspect, the present invention relates to a mixed-plastic-polyethylene composition comprising a total amount of ethylene units (C2 units) of from 87.0 to 97.0 wt.-%, and a total amount of continuous units having 3 carbon atoms corresponding to polypropylene (continuous C3 units) of from 1.0 to 12.0 wt.-%, and a total amount of units having 4 carbon atoms (C4 units) of from 1.75 wt.-% to 2.25 wt.-%.

In a preferred aspect the present invention relates to a mixed-plastic-polyethylene composition comprising a total amount of ethylene units (C2 units) of from 90.0 to 96.0 wt.-%, and a total amount of continuous units having 3 carbon atoms corresponding to polypropylene (continuous C3 units) of from 2.5 to 7.0 wt.-%, preferably from 2.5 to 6.0 wt.-%, and a total amount of units having 4 carbon atoms (C4 units) of from 1.75 wt.-% to 2.20 wt.-%, more preferably from 1.75 wt.-% to 2.15 wt.-%, still more preferably from 1.80 wt.-% to 2.10 wt.-%.

with the total amounts of C2 units, continuous C3 units and units having 4 carbon atoms being based on the total weight amount of monomer units in the composition and measured according to quantitative $^{13}C\{^{1}H\}$ NMR measurement, and wherein the composition has a melt flow rate (ISO 1133, 2.16 kg, 190° C.) of from 0.1 to 0.9 g/10 min, and a density of from 956 kg/m³ to 968 kg/m, preferably from 958 kg/m³ to 968 kg/m³, and more preferably from 960 to 966 kg/m³.

In said aspect the mixed-plastic-polyethylene composition preferably comprises carbon black in an amount of 1.0 to 3.0 wt.-% with respect to the total of the mixed-plastic-polyethylene composition, more preferably of 1.5 to 2.8 wt.-%, most preferably 1.8 to 2.6 wt.-%.

In said aspect the mixed-plastic-polyethylene composition is preferably obtainable by blending and extruding a) 5.0 to 35.0 wt.-% of a mixed-plastic-polyethylene primary recycling blend (A) wherein 90.0 wt.-%, preferably 95.0 wt.-%, more preferably 100.0 wt.-% of the mixed-plastic-polyethylene primary blend (A) originates from post-consumer waste having a limonene content of from 0.10 to 500 ppm; and wherein the mixed-plastic-polyethylene primary blend (A) has a melt flow rate (ISO 1133, 2.16 kg, 190° C.) of from 0.1 to 1.5 g/10 min, preferably from 0.4 to 1.3 g/10 min, a density of from 945 to 990 kg/m$^3$, optionally a shear thinning index $SHI_{2.7/210}$ of from 30 to 60, preferably from 35 to 50 optionally a polydispersity index from 1.6 to 2.5 s$^{-1}$, preferably from 1.6 to 2.2 s$^{-1}$ as obtained from rheological measurement, and a content of units derived from ethylene of 70 to 95 wt.-% as determined by quantitative $^{13}C\{^1H\}$-NMR, b) 65.0 to 95.0 wt.-% of a secondary component (B) being a virgin high-density polyethylene (HDPE) optionally blended with carbon black, the secondary component (B) having a melt flow rate (ISO 1133, 2.16 kg, 190° C.) of from 0.1 to 1.2 g/10 min, preferably from 0.3 to 0.7 g/10 min;

a density of from 940 to 970 kg/m$^3$, preferably from 955 to 970 kg/m$^3$, a shear thinning index $SHI_{2.7/210}$ of 15 to 30 a polydispersity index from 1.6 to 2.2 s$^{-1}$ as obtained from rheological measurement, optionally a carbon black content of 1.5 to 3.0 wt.-% with respect to the secondary component (B), and preferably a limonene content below 0.10 ppm.

It is further preferred that the mixed-plastic-polyethylene composition is obtainable by blending and extruding a) 5.0 to 35.0 wt.-% of a mixed-plastic-polyethylene primary recycling blend (A) wherein 90.0 wt.-%, preferably 95.0 wt.-%, more preferably 100.0 wt.-% of the mixed-plastic-polyethylene primary blend (A) originates from post-consumer waste having a limonene content of from 0.10 to 500 ppm; and wherein the mixed-plastic-polyethylene primary blend (A) has a melt flow rate (ISO 1133, 2.16 kg, 190° C.) of from 0.1 to 1.5 g/10 min, preferably from 0.4 to 1.3 g/10 min, a density of from 945 to 990 kg/m$^3$, optionally a shear thinning index $SHI_{2.7/210}$ of 35 to 50 optionally a polydispersity index from 1.6 to 2.2 s$^{-1}$ as obtained from rheological measurement, and a content of units derived from ethylene of 70 to 95 wt.-% as determined by quantitative $^{13}C\{^1H\}$-NMR, b) 65.0 to 95.0 wt.-% of a secondary component (B) being a virgin high-density polyethylene (HDPE) optionally blended with carbon black, the secondary component (B) having a melt flow rate (ISO 1133, 2.16 kg, 190° C.) of from 0.1 to 1.2 g/10 min, preferably from 0.3 to 0.7 g/10 min;

a density of from 955 to 970 kg/m$^3$, a shear thinning index $SHI_{2.7/210}$ of 15 to 30 a polydispersity index from 1.6 to 2.2 s$^{-1}$ as obtained from rheological measurement, optionally a carbon black content of 1.5 to 3.0 wt.-% with respect to the secondary component (B), and preferably a limonene content below 0.10 ppm.

In a second aspect the present invention relates to a mixed-plastic-polyethylene composition obtainable by blending and extruding a) 5.0 to 35.0 wt.-% of a mixed-plastic-polyethylene primary recycling blend (A) wherein 90.0 wt.-%, preferably 95.0 wt.-%, more preferably 100.0 wt.-% of the mixed-plastic-polyethylene primary blend (A) originates from post-consumer waste having a limonene content of from 0.10 to 500 ppm; and wherein the mixed-plastic-polyethylene primary blend (A) has a melt flow rate (ISO 1133, 2.16 kg, 190° C.) of from 0.1 to 1.5 g/10 min, preferably from 0.4 to 1.3 g/10 min, a density of from 945 to 990 kg/m$^3$, optionally a shear thinning index $SHI_{2.7/210}$ of 30 to 60, preferably 35 to 50 optionally a polydispersity index from 1.2 to 2.5 s$^{-1}$, preferably 1.6 to 2.2 s$^{-1}$ as obtained from rheological measurement, and a content of units derived from ethylene of 70 to 95 wt.-% as determined by quantitative $^{13}C\{^1H\}$-NMR, b) 65.0 to 95.0 wt.-% of a secondary component (B) being a virgin high-density polyethylene (HDPE) optionally blended with carbon black, the secondary component (B) having a melt flow rate (ISO 1133, 2.16 kg, 190° C.) of from 0.1 to 1.2 g/10 min, preferably from 0.3 to 0.7 g/10 min;

a density of from 955 to 970 kg/m$^3$, a shear thinning index $SHI_{2.7/210}$ of 15 to 30 a polydispersity index from 1.6 to 2.2 s$^{-1}$ as obtained from rheological measurement, optionally a carbon black content of 1.5 to 3.0 wt.-% with respect to the secondary component (B), and preferably a limonene content below 0.10 ppm.

It is preferred that the mixed-plastic-polyethylene composition of the second aspect is obtainable by blending and extruding a) 5.0 to 35.0 wt.-% of a mixed-plastic-polyethylene primary recycling blend (A) wherein 90.0 wt.-%, preferably 95.0 wt.-%, more preferably 100.0 wt.-% of the mixed-plastic-polyethylene primary blend (A) originates from post-consumer waste having a limonene content of from 0.10 to 500 ppm; and wherein the mixed-plastic-polyethylene primary blend (A) has a melt flow rate (ISO 1133, 2.16 kg, 190° C.) of from 0.1 to 1.5 g/10 min, preferably from 0.4 to 1.3 g/10 min, a density of from 945 to 990 kg/m$^3$, optionally a shear thinning index $SHI_{2.7/210}$ of 35 to 50 optionally a polydispersity index from 1.6 to 2.2 s$^{-1}$ as obtained from rheological measurement, and a content of units derived from ethylene of 70 to 95 wt.-% as determined by quantitative $^{13}C\{^1H\}$-NMR, b) 65.0 to 95.0 wt.-% of a secondary component (B) being a virgin high-density polyethylene (HDPE) optionally blended with carbon black, the secondary component (B) having a melt flow rate (ISO 1133, 2.16 kg, 190° C.) of from 0.1 to 1.2 g/10 min, preferably from 0.3 to 0.7 g/10 min;

a density of from 955 to 970 kg/m$^3$, a shear thinning index $SHI_{2.7/210}$ of 15 to 30 a polydispersity index from 1.6 to 2.2 s$^{-1}$ as obtained from rheological measurement, optionally a carbon black content of 1.5 to 3.0 wt.-% with respect to the secondary component (B), and preferably a limonene content below 0.10 ppm.

The mixed-plastic-polyethylene composition comprises a total amount of ethylene units (C2 units) of from 90.0 to 96.0 wt.-%, preferably from 91.0 to 95.5 wt.-%, more preferably from 92.0 to 94.5 wt.-%, and a total amount of continuous units having 3 carbon atoms corresponding to polypropylene (continuous C3 units)

of from 2.5 to 7.0 wt.-%, preferably from 3.0 wt.-% to 6.0 wt.-%, more preferably from 3.5 wt.-% to 6.0 wt.-%, and a total amount of units having 4 carbon atoms (C4 units) of from 1.75 wt.-% to 2.20 wt.-%, more preferably from 1.75 wt.-% to 2.15 wt.-%, still more preferably from 1.80 wt.-% to 2.10 wt.-%.

In a preferable embodiment, the mixed-plastic-polyethylene composition comprises a total amount of ethylene units (C2 units) of from 91.0 to 95.5 wt.-%, and a total amount of continuous units having 3 carbon atoms corresponding to polypropylene (continuous C3 units) of from 3.0 wt.-% to 6.0 wt.-%, and a total amount of units having 4 carbon atoms (C4 units) of from 1.75 wt.-% to 2.15 wt.-%.

In a yet more preferable embodiment, the mixed-plastic-polyethylene composition comprises a total amount of ethylene units (C2 units) of from 92.0 to 94.5 wt.-%, and a total amount of continuous units having 3 carbon atoms corresponding to polypropylene (continuous C3 units) of from 3.5 wt.-% to 6.0 wt.-%, and a total amount of units having 4 carbon atoms (C4 units) of from 1.80 wt.-% to 2.10 wt.-%.

The mixed-plastic-polyethylene composition preferably has a content of carbon black from 1.8 to 2.8 wt.-%.

Further, the mixed-plastic-polyethylene composition preferably comprises one or more in any combination of, more preferably all of:

a total amount of units having 3 carbon atoms as isolated peaks in the NMR spectrum (isolated C3 units) of from 0.00 wt.-% to 0.20 wt.-%, more preferably from 0.00 wt.-% to 0.15 wt.-%, still more preferably from 0.00 wt.-% to 0.10 wt.-%;

a total amount of units having 6 carbon atoms (C6 units) of from 0.00 wt.-% to 0.10 wt.-%, more preferably from 0.00 wt.-% to 0.05 wt.-%, still more preferably from 0.00 wt.-% to 0.03 wt.-%;

a total amount of units having 7 carbon atoms (C7 units) of from 0.00 wt.-% to 0.20 wt.-%, more preferably from 0.00 wt.-% to 0.15 wt.-%, still more preferably from 0.00 wt.-% to 0.10 wt.-%;

wherein the total amounts of isolated C3 units, C4 units, C6 units, C7 units are based on the total weight amount of monomer units in the composition and are measured or calculated according to quantitative $^{13}C\{^1H\}$ NMR measurement.

Preferably, the total amounts of units, which can be attributed to comonomers other than C4 units (i.e. isolated C3 units, C6 units and C7 units), in the mixed-plastic-polyethylene composition is from 0.00 wt.-% to 0.50 wt.-%, more preferably from 0.00 wt.-% to 0.30 wt.-%, still more preferably from 0.00 wt.-% to 0.20 wt.-%, and is measured according to quantitative $^{13}C\{^1H\}$ NMR measurement.

The mixed-plastic polyethylene composition according to the present invention has a a melt flow rate (ISO 1133, 2.16 kg, 190° C.) of from 0.1 to 0.9 g/10 min, preferably from 0.3 to 0.7 g/10 min;

a density of from 956 kg/m³ to 968 kg/m³, preferably from 958 kg/m³ to 968 kg/m³, and more preferably from 960 to 966 kg/m³;

The composition can have further components apart from the mixed-plastic-polyethylene primary recycling blend (A) and the secondary component (B) such as further polymeric components or additives in amounts of not more than 15 wt.-%, based on the total weight of the composition.

Suitable additives are usual additives for utilization with polyolefins, such as stabilizers, (e.g. antioxidant agents), metal scavengers and/or UV stabilizers, antistatic agents, and utilization agents. The additives can be present in the composition in an amount of 10 wt.-% or below, more preferably 9 wt.-% or below, more preferably 7 wt.-% or below.

It is, however, preferred that the composition consists of the mixed-plastic-polyethylene primary recycling blend (A) and the secondary component (B).

The mixed-plastic-polyethylene primary recycling blend (A) is preferably present in amounts of 5.0 to 35.0 wt.-% and the secondary component (B) is present in amounts of 65.0 to 95.0 wt.-% respectively, the secondary component (B) being a virgin high-density polyethylene (HDPE) optionally blended with carbon black.

The mixed-plastic-polyethylene primary recycling blend (A) and the secondary component (B) are generally defined as described above or below.

The mixed plastic polyethylene composition preferably has an impact strength at 23° C. (ISO 179-1 eA) of from 3.0 to 15.0 kJ/m², preferably from 5.0 to 12.0 kJ/m².

Further, the mixed plastic polyethylene composition preferably has an impact strength at 0° C. (according to ISO 179-1 eA) of from 2.0 to 10.0 kJ/m², more preferably from 3.5 to 8.0 kJ/m².

The mixed-plastic-polyethylene composition preferably has a strain hardening modulus (SH modulus) of from 15.0 to 24.0 MPa, more preferably, 17.0 to 24.0 MPa, yet more preferably from 18.0 to 22.0 MPa and most preferably from 19.0 to 21.0 MPa.

Preferably, the SH modulus of the mixed-plastic-polyethylene composition is at least 65%, more preferably at least 70% of the SH modulus of the secondary component (B). Furthermore, the SH modulus of the mixed-plastic-polyethylene composition is preferably at most 90%, more preferably at most 85% of the SH modulus of the secondary component (B).

It is preferred that that the mixed-plastic-polyethylene composition preferably has a Shore D hardness, measured according to ISO 868 with a measuring time of 1 s, Shore D 1s, of from 55.0 to 70.0, more preferably from 57.0 to 68.0 and most preferably from 60.0 to 65.0, and/or a Shore D hardness, measured according to ISO 868 with a measuring time of 3 s, Shore D 3s, of from 55.0 to 70.0, more preferably from 57.0 to 68.0 and most preferably from 60.0 to 65.0, and/or a Shore D hardness, measured according to ISO 868 with a measuring time of 15 s, Shore D 15s, of from 55.0 to 70.0, more preferably from 57.0 to 68.0 and most preferably from 60.0 to 65.0.

The mixed-plastic-polyethylene composition preferably has one or more, preferably all of the following rheological properties, in any combination:

a shear thinning index $SHI_{2.7/210}$ of from 25.0 to 40.0, more preferably 26 to 30, most preferably from 27 to 29, and/or a complex viscosity at 0.05 rad/s, $eta_{0.05}$, of from 22000 to 29000 Pa·s, more preferably 22000 to 28000 Pa·s, most preferably from 23000 to 27000 Pa·s, and/or a complex viscosity at 300 rad/s, $eta_{300}$, of from 600 to 850 Pa·s, more preferably from 625 to 800 Pa·s, and/or a polydispersity index PI of from 1.5 to 2.5 s$^{-1}$, more preferably from 1.6 to 2.3 s$^{-1}$.

Further, the mixed-plastic-polyethylene composition preferably has one or more, preferably all of the following melt flow rate properties, in any combination:
- a melt flow rate (ISO 1133, 2.16 kg, 190° C.) of from 0.3 to 0.7 g/10 min, and/or
- a melt flow rate (ISO 1133, 5 kg, 190° C.) of from 1.7 to 2.7 g/10 min, and/or
- a melt flow rate (ISO 1133, 21 kg, 190° C.) of from 40.0 to 55.0 g/10 min.

Still further, the mixed-plastic-polyethylene composition preferably has one or more, preferably all of the following tensile properties, in any combination:
- a tensile strain at break, measured according to ISO 527-2 on compression moulded test specimens of type 5A, of from 400% to 750%, more preferably from 450% to 650%; and/or
- a tensile stress at break, measured according to ISO 527-2 on compression moulded test specimens of type 5A, of from 10 MPa to 30 MPa, more preferably from 15 MPa to 25 MPa.

Further, the mixed-plastic-polyethylene composition preferably has a tear resistance of from 15.0 to 30.0 N/mm, more preferably of from 17.5 to 27.5 N/mm and most preferably of from 20.0 to 25.0 N/mm. The tear resistance of the mixed-plastic-polyethylene composition is measured on a compression moulded plaque made from the composition having 1 mm thickness.

It is further preferred that the mixed-plastic-polyethylene composition has a pressure deformation of not more than 15%, more preferably not more than 10%. The lower limit is usually at least 3%, preferably at least 4%.

Still further, the mixed-plastic-polyethylene composition has a water content of preferably not more than 250 ppm more preferably not more than 230 ppm. The lower limit is usually at least 25 ppm, preferably at least 50 ppm.

The mixed-plastic-polyethylene composition preferably also has an ESCR (Bell test failure time of at least 1000 hours, preferably at least 1500 hours, most preferably at least 2000 hours.

Article

The present application is further directed to an article comprising the mixed-plastic-polyethylene composition as described above.

In a preferred embodiment, the article is used in jacketing applications i.e. for a cable jacket. Preferably, the article is a cable comprising at least one layer which comprises the mixed-plastic-polyethylene composition as described above.

Preferably, the cable comprising a layer such as a jacketing layer, which comprises the mixed-plastic-polyethylene composition as described above, has a cable shrinkage of not more than 2.0%, more preferably not more than 1.8%. The lower limit is usually at least 0.3%, preferably at least 0.5%.

All preferred aspects and embodiments as described above shall also hold for the article.

Process

The present invention also relates to a process for preparing the mixed-plastic-polyethylene composition as defined above or below. The process according to the present invention results in an improvement in the mechanical properties of the mixed-plastic-polyethylene primary recycling blend (A).

The process according to the present invention comprises the steps of:
a. providing a mixed-plastic-polyethylene primary recycling blend (A) in an amount of preferably 5.0 to 35.0 wt.-% based on the overall weight of the composition, wherein 90.0 wt.-%, preferably 95.0 wt.-%, more preferably 100.0 wt.-% of the mixed-plastic-polyethylene primary blend (A) originates from post-consumer waste having a limonene content of from 0.10 to 500 ppm and wherein the mixed-plastic-polyethylene primary blend has
- a melt flow rate (ISO 1133, 2.16 kg, 190° C.) of from 0.1 to 1.5 g/10 min, preferably from 0.4 to 1.3 g/10 min,
- a density of from 945 to 990 kg/m$^3$,
- a shear thinning index $SHI_{2.7/210}$ of 30 to 60, preferably 35 to 50
- a polydispersity index from 1.2 to 2.5 s$^{-1}$, preferably from 1.6 to 2.2 s$^{-1}$ as obtained from rheological measurement,
- and a content of units derived from ethylene of 70.0 to 95.0 wt.-% as determined by quantitative $^{13}C\{^1H\}$-NMR, b. providing a secondary component (B) being a virgin high-density polyethylene (HDPE) optionally blended with carbon black, in an amount of preferably from 65.0 to 95.0 wt.-% based on the overall weight of the composition, the secondary component (B) having
- a melt flow rate (ISO 1133, 2.16 kg, 190° C.) of from 0.1 to 1.2 g/10 min, preferably from 0.3 to 0.7 g/10 min,
- a density of from 940 to 970 kg/m$^3$, preferably 955 to 970 kg/m$^3$,
- optionally a shear thinning index $SHI_{2.7/210}$ of 15 to 30,
- a polydispersity index from 1.6 to 2.2 s$^{-1}$ as obtained from rheological measurement,
- optionally a carbon black content of 1.5 to 3.0 wt.-% with respect to the secondary component (B); and preferably, a limonene content below 0.10 ppm.

c. melting and mixing the blend of mixed-plastic-polyethylene primary blend (A) and the secondary component (B) in an extruder, optionally a twin screw extruder, and d. optionally pelletizing the obtained mixed-plastic-polyethylene composition.

All preferred aspects, definitions and embodiments as described above shall also hold for the process.

Experimental Part

1. Test Methods a) Melt Flow Rate

Melt flow rates were measured with a load of 2.16 kg (MFR$_2$), 5.0 kg (MFR$_5$) or 21.6 kg (MFR$_{21}$) at 190° C. as indicated. The melt flow rate is that quantity of polymer in grams which the test apparatus standardized to ISO 1133 extrudes within 10 minutes at a temperature of or 190° C. under a load of 2.16 kg, 5.0 kg or 21.6 kg.

b) Density

Density is measured according to ISO 1183-187. Sample preparation is done by compression moulding in accordance with ISO 17855-2.

c) Comonomer Content

Quantification of C4 in polyethylene by NMR spectroscopy (used for carrier polyethylene of the carbon black masterbatch)

Quantitative nuclear-magnetic resonance (NMR) spectroscopy was used to quantify the comonomer content of the polymer.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09}. Standard single-pulse excitation was employed utilising the transient NOE at short recycle delays of 3s {pollard04, klimke06} and the RS-HEPT decoupling scheme {fillip05,griffin07}. A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {randall89}. Characteristic signals corresponding to the incorporation of 1-butene were observed (randall89) and all contents calculated with respect to all other monomers present in the polymer.

Characteristic signals resulting from isolated 1-butene incorporation i.e. EEBEE comonomer sequences, were observed. Isolated 1-butene incorporation was quantified using the integral of the signal at 39.9 ppm assigned to the *B2 sites, accounting for the number of reporting sites per comonomer:

$$B = I*B2$$

With no other signals indicative of other comonomer sequences, i.e. consecutive comonomer incorporation, observed the total 1-butene comonomer content was calculated based solely on the amount of isolated 1-butene sequences:

$$B_{total} = B$$

The relative content of ethylene was quantified using the integral of the bulk methylene (□+) signals at 30.00 ppm:

$$E = (½)*I_{□+}$$

The total ethylene comonomer content was calculated based the bulk methylene signals and accounting for ethylene units present in other observed comonomer sequences:

$$E_{total} = E + (5/2)*B$$

The total mole fraction of 1-butene in the polymer was then calculated as:

$$fB = B_{total}/(E_{total} + B_{total})$$

The total comonomer incorporation of 1-butene in mole percent was calculated from the mole fraction in the usual manner:

$$B\ [mol\ \%] = 100*fB$$

The total comonomer incorporation of 1-butene in weight percent was calculated from the mole fraction in the standard manner:

$$B\ [wt\ \%] = 100*fB*56.11/((fB*56.11)+((1-fB)*28.05))$$

klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009)
randall89
J. Randall, Macromol. Sci., Rev. Macromol. Chem. Phys. 1989, C29, 201.

Quantification of C2, iPP (Continuous C3), LDPE and Polyethylene Short Chain Branches Quantitative $^{13}C\{^1H\}$ NMR spectra were recorded in the solution-state using a Bruker AvanceIII 400 MHz NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent {singh09}. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {zhou07,busico07}. A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. Characteristic signals corresponding to polyethylene with different short chain branches (B1, B2, B4, B5, B6plus) and polypropylene were observed {randall89, brandolini00}.

Characteristic signals corresponding to the presence of polyethylene containing isolated B1 branches (starB1 33.3 ppm), isolated B2 branches (starB2 39.8 ppm), isolated B4 branches (twoB4 23.4 ppm), isolated B5 branches (threeB5 32.8 ppm), all branches longer than 4 carbons (starB4plus 38.3 ppm) and the third carbon from a saturated aliphatic chain end (3s 32.2 ppm) were observed. The intensity of the combined ethylene backbone methine carbons (ddg) containing the polyethylene backbone carbons (dd 30.0 ppm), γ-carbons (g 29.6 ppm) the 4s and the threeB4 carbon (to be compensated for later on) is taken between 30.9 ppm and 29.3 ppm excluding the Tββ from polypropylene. The amount of C2 related carbons was quantified using all mentioned signals according to the following equation:

$$fC_{C2total} = (Iddg - ItwoB4) + (IstarB1*6) + (IstarB2*7) + (ItwoB4*9) + I(threeB5*10) + ((IstarB4plus - ItwoB4 - IthreeB5)*7) + (I3s*3)$$

Characteristic signals corresponding to the presence of polypropylene (iPP, continuous C3)) were observed at 46.7 ppm, 29.0 ppm and 22.0 ppm. The amount of PP related carbons was quantified using the integral of Sαα at 46.6 ppm:

$$fC_{PP}=Is\alpha\alpha*3$$

The weight percent of the C2 fraction and the polypropylene can be quantified according following equations:

$$wt_{C2fraction}=fC_{C2total}*100/(fC_{C2total}+fC_{PP})$$

$$wt_{PP}=fC_{PP}*100/(fC_{C2total}+fC_{PP})$$

Characteristic signals corresponding to various short chain branches were observed and their weight percentages quantified as the related branch would be an alpha-olefin, starting by quantifying the weight fraction of each:

$$fwtC2=fC_{C2total}-((IstarB1*3)-(IstarB2*4)-(ItwoB4*6)-(IthreeB5*7)$$

$$fwtC3(\text{isolated } C3)=IstarB1*3$$

$$fwtC4=IstarB2*4$$

$$fwtC6=ItwoB4*6$$

$$fwtC7=IthreeB5*7$$

Normalisation of all weight fractions leads to the amount of weight percent for all related branches:

$$fsum_{wt.-\% \ total}=fwtC2+fwtC3+fwtC4+fwtC6+fwtC7+fC_{PP}$$

$$wtC2total=fwtC2*100/fsum_{wt.\%\ total}$$

$$wtC3total=fwtC3*100/fsum_{wt.-\%\ total}$$

$$wtC4total=fwtC4*100/fsum_{wt.-\%\ total}$$

$$wtC6total=fwtC6*100/fsum_{wt.-\%\ total}$$

$$wtC7total=fwtC7*100/fsum_{wt.-\%\ total}$$

The content of LDPE can be estimated assuming the B5 branch, which only arises from ethylene being polymerised under high pressure process, being almost constant in LDPE. We found the average amount of B5 if quantified as C7 at 1.46 wt.-%. With this assumption it is possible to estimate the LDPE content within certain ranges (approximately between 20 wt.-% and 80 wt.-%), which are depending on the SNR ratio of the threeB5 signal:

$$wt.-\%\ LDPE=wtC7total*100/1.46$$

REFERENCES zhou07 Zhou, Z., Kuemmerle, R., Qiu, X., Redwine, D., Cong, R., Taha, A., Baugh, D. Winniford, B., J. Mag. Reson. 187 (2007) 225 busico07 Busico, V., Carbonniere, P., Cipullo, R., Pellecchia, R., Severn, J., Talarico, G., Macromol. Rapid Commun. 2007, 28, 1128 singh09 Singh, G., Kothari, A., Gupta, V., Polymer Testing 28 5 (2009), 475 randall89 J. Randall, Macromol. Sci., Rev. Macromol. Chem. Phys. 1989, C29, 201.

brandolini00 A. J. Brandolini, D. D. Hills, NMR Spectra of Polymers and Polymer Additives, Marcel Dekker Inc., 2000 d) Impact Strength

The impact strength is determined as Charpy Notched Impact Strength according to ISO 179-1 eA at +23° C. and at 0° C. on compression moulded specimens of 80×10×4 mm prepared according to ISO 17855-2.

e) Tensile Testing of 5A Specimen and that after Ageing of 5A Specimen at 110° C., 14 Days (336h)

For tensile testing, dog bone specimens of 5A are prepared according to ISO 527-2/5A by die cutting from compression moulded plaques of 2 mm' thickness. If ageing is needed, the 5A specimens are kept at 110° C. in a cell oven for 14 days (336 hours). All specimens are conditioned for at least 16 hours at 23° C. and 50% relative humidity before testing.

Tensile properties are measured according to ISO 527-1/2 at 23° C. and 50% relative humidity with Alwetron R24, 1 kN load cell. Tensile testing speed is 50 mm/min, grip distance is 50 mm and gauge length is 20 mm.

f) Rheological Measurements

Dynamic Shear Measurements (Frequency Sweep Measurements)

The characterisation of melt of polymer composition or polymer as given above or below in the context by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

where $\sigma_0$ and $\gamma_0$ are the stress and strain amplitudes, respectively $\omega$ is the angular frequency $\delta$ is the phase shift (loss angle between applied strain and stress response)

t is the time

Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η" and the loss tangent, tan δ which can be expressed as follows:

$$G' = \frac{\sigma_0}{\gamma_0}\cos\delta\ [Pa] \quad (3)$$

$$G'' = \frac{\sigma_0}{\gamma_0}\sin\delta\ [Pa] \quad (4)$$

$$G^* = G' + iG''\ [Pa] \quad (5)$$

-continued $$\eta^* = \eta' - i\eta'' \ [\text{Pa} \cdot \text{s}] \quad (6)$$

$$\eta' = \frac{G''}{\omega} \ [\text{Pa} \cdot \text{s}] \quad (7)$$

$$\eta'' = \frac{G'}{\omega} \ [\text{Pa} \cdot \text{s}] \quad (8)$$

The determination of so-called Shear Thinning Index, which correlates with MWD and is independent of Mw, is done as described in equation 9.

$$SHI_{(x/y)} = \frac{\text{Eta}^* \text{ for } (G^* = xkPa)}{\text{Eta}^* \text{ for } (G^* = ykPa)} \quad (9)$$

For example, the $SHI_{2.7/210}$ is defined by the value of the complex viscosity, in Pa s, determined for a value of G* equal to 2.7 kPa, divided by the value of the complex viscosity, in Pa s, determined for a value of G* equal to 210 kPa.

The values of storage modulus (G'), loss modulus (G"), complex modulus (G*) and complex viscosity ($\eta^*$) were obtained as a function of frequency ($\omega$).

Thereby, e.g. $\eta^*_{300rad/s}$ (eta*$_{300rad/s}$) is used as abbreviation for the complex viscosity at the frequency of 300 rad/s and $\eta_{300rad/s}$ (eta*$_{0.05rad/s}$) is used as abbreviation for the complex viscosity at the frequency of 0.05 rad/s.

The loss tangent tan (delta) is defined as the ratio of the loss modulus (G") and the storage modulus (G') at a given frequency. Thereby, e.g. $\tan_{0.05}$ is used as abbreviation for the ratio of the loss modulus (G") and the storage modulus (G') at 0.05 rad/s and $\tan_{300}$ is used as abbreviation for the ratio of the loss modulus (G") and the storage modulus (G') at 300 rad/s.

The elasticity balance $\tan_{0.05}/\tan_{300}$ is defined as the ratio of the loss tangent $\tan_{0.05}$ and the loss tangent $\tan_{300}$.

Besides the above mentioned rheological functions one can also determine other rheological parameters such as the so-called elasticity index EI(x). The elasticity index EI(x) is the value of the storage modulus (G') determined for a value of the loss modulus (G") of x kPa and can be described by equation 10.

$$EI(x) = G' \text{ for } (G'' = x \, kPa)[Pa] \quad (10)$$

For example, the EI(5 kPa) is the defined by the value of the storage modulus (G'), determined for a value of G" equal to 5 kPa.

The polydispersity index, PI, is defined by equation 11.

$$PI = \frac{10^5}{G'(\omega_{COP})}, \omega_{COP} = \omega \text{ for } (G' = G'') \quad (11)$$

where $\omega_{cop}$ is the cross-over angular frequency, determined as the angular frequency for which the storage modulus, G', equals the loss modulus, G".

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th

[2] The influence of molecular structure on some rheological properties of polyethylene", Heino, E. L., Borealis Polymers Oy, Porvoo, Finland, Annual Transactions of the Nordic Rheology Society, 1995.).

[3] Definition of terms relating to the non-ultimate mechanical properties of polymers, Pure & Appl. Chem., Vol. 70, No. 3, pp. 701-754, 1998.

g) ESCR (Bell Test, h)

By the term ESCR (environmental stress cracking resistance) is meant the resistance of the polymer to crack formation under the action of mechanical stress and a reagent in the form of a surfactant. The ESCR is determined in accordance with IEC 60811-406, method B. The reagent employed is 10 weight % Igepal CO 630 in water. The materials were prepared according to instructions for HDPE as follows: The materials were pressed at 165° C. to a thickness of 1.75-2.00 mm. The notch was 0.30-0.40 mm deep.

h) Shore D Hardness

Two different Shore D hardness measurements were conducted:

Firstly, Shore D hardness is determined according to ISO 868 on moulded specimen with a thickness of 4 mm. The shore hardness is determined after 1 sec, 3 sec or 15 sec after the pressure foot is in firm contact with the test specimen. The sample is compression moulded according to ISO 17855-2 and milled into specimens of 80×10×4 mm.

Secondly, Shore D hardness is determined according to ASTM D2240-03. The same samples as for the Shore D hardness according to ISO 868 were used.

i) Strain Hardening (SH) Modulus

The strain hardening test is a modified tensile test performed at 80° C. on a specially prepared thin sample. The Strain Hardening Modulus (MPa), <Gp>, is calculated from True Strain-True Stress curves; by using the slope of the curve in the region of True Strain, $\lambda$, is between 8 and 12.

The true strain, $\lambda$, is calculated from the length, l (mm), and the gauge length, l0 (mm), as shown by Equation 1.

$$\lambda = \frac{l}{l_0} = 1 + \frac{\Delta l}{l_0} \quad (1)$$

where $\Delta l$ is the increase in the specimen length between the gauge marks, (mm). The true stress, σtrue (MPa), is calculated according to formula 2, assuming conservation of volume between the gauge marks:

$$\sigma_{true} = \sigma_n \lambda \quad (2)$$

where σn is the engineering stress.

The Neo-Hookean constitutive model (Equation 3) is used to fit the true strain-true stress data from which <Gp> (MPa) for 8<$\lambda$<12 is calculated.

$$\sigma_{true} = \frac{\langle Gp \rangle}{20}\left(\lambda^2 - \frac{1}{\lambda}\right) + C \quad (3)$$

where C is a mathematical parameter of the constitutive model describing the yield stress extrapolated to $\lambda$=0.

Initially five specimens are measured. If the variation coefficient of <Gp> is greater than 2.5%, then two extra specimens are measured. In case straining of the test bar takes place in the clamps the test result is discarded.

The PE granules of materials were compression molded in sheets of 0.30 mm thickness according to the press parameters as provided in ISO 17855-2.

After compression molding of the sheets, the sheets were annealed to remove any orientation or thermal history and maintain isotropic sheets. Annealing of the sheets was performed for 1 h in an oven at a temperature of (120±2) °C. followed by slowly cooling down to room temperature by switching off the temperature chamber. During this operation free movement of the sheets was allowed.

Next, the test pieces were punched from the pressed sheets. The specimen geometry of the modified ISO 37:1994 Type 3 (FIG. 3) was used.

The sample has a large clamping area to prevent grip slip, dimensions given in Table 1.

TABLE 1

Dimensions of Modified ISO 37:1994 Type 3

| Dimension | | Size (mm) |
|---|---|---|
| L  | start length between clamps | 30.0 +/− 0.5 |
| I0 | Gauge length | 12.5 +/− 0.1 |
| I1 | Prismatic length | 16.0 +/− 1.0 |
| I3 | Total length | 70 |
| R1 | Radius | 10.0 +/− 0.03 |
| R2 | Radius | 8.06 +/− 0.03 |
| b1 | Prismatic width | 4.0 +/− 0.01 |
| b2 | Clamp width | 20.0 +/− 1.0 |
| h  | Thickness | 0.30 + 0.05/0.30−0.03 |

The punching procedure is carried out in such a way that no deformation, crazes or other irregularities are present in the test pieces.

The thickness of the samples was measured at three points of the parallel area of the specimen; the lowest measured value of the thickness of these measurements was used for data treatment.

1. The following procedure is performed on a universal tensile testing machine having controlled temperature chamber and non-contact extensometer:
2. Condition the test specimens for at least 30 min in the temperature chamber at a temperature of (80±1) °C. prior to starting the test.
3. Clamp the test piece on the upper side.
4. Close the temperature chamber.
5. Close the lower clamp after reaching the temperature of (80±1) °C.
6. Equilibrate the sample for 1 min between the clamps, before the load is applied and measurement starts.
7. Add a pre-load of 0.5 N at a speed of 5 mm/min.
8. Extend the test specimen along its major axis at a constant traverse speed (20 mm/min) until the sample breaks.
    During the test, the load sustained by the specimen is measured with a load cell of 200 N. The elongation is measured with a non-contact extensometer.

j) Water Content

The water content was determined as described in ISO15512:2019 Method A—Extraction with anhydrous methanol. There the test portion is extracted with anhydrous methanol and the extracted water is determined by a coulometric Karl Fischer Titrator.

k) Cable Extrusion

The cable extrusion is done on a Nokia-Maillefer cable line. The extruder has five temperature zones with temperatures of 170/175/180/190/190° C. and the extruder head has three zones with temperatures of 210/210/210° C. The extruder screw is a barrier screw of the design Elise. The die is a semi-tube on type with 5.9 mm diameter and the outer diameter of the cable is 5 mm. The compound is extruded on a 3 mm in diameter, solid aluminum conductor to investigate the extrusion properties. Line speed is 75 m/min. The pressure at the screen and the current consumption of the extruder is recorded for each material.

l) Pressure deformation

Pressure test is conducted according to EN 60811-508. An extruded cable sample is placed in an air oven at a 115° C. and subjected to a constant load applied by means of a special indentation device (with a rectangular indentation 0.7 mm wide knife) for 6 hours. The percentage of indentation is measured afterwards using a digital gauge.

m) Cable Shrinkage

The shrinkage of the composition is determined with the cable samples obtained from the cable extrusion. The cables are conditioned in the constant room at least 24 hours before the cutting of the samples. The conditions in the constant room are 23±2° C. and 50±5% humidity. Samples are cut to 400 mm at least 2 m away from the cable ends. They are further conditioned in the constant room for 24 hours after which they are place in an oven on a talcum bed at 100° C. for 24 hours. After removal of the sample from the oven they are allowed to cool down to room temperature and then measured. The shrinkage is calculated according to formula below:

$[(L_{Before}-L_{After})/L_{Before}]\times 100\%$, wherein $L$ is length.

n) Tear Resistance

Tear resistance is measured on compression moulded plaques of 1 mm thickness according to BS 6469 section 99.1. A test piece with a cut is used to measure the tear force by means of a tensile testing machine. The tear resistance is calculated by dividing the maximum force needed to tear the specimen by its thickness.

o) Amount of Limonene

This method allows nature of a raw mixed-plastic-polyethylene primary recycling blend to be determined.

Limonene quantification was carried out using solid phase microextraction (HS-SPME-GC-MS) by standard addition.

20 mg cryomilled samples were weighed into 20 mL headspace vials and after the addition of limonene in different concentrations and a glass-coated magnetic stir bar, the vial was closed with a magnetic cap lined with silicone/PTFE. Micro capillaries (10 pL) were used to add diluted limonene standards of known concentrations to the sample. Limonene was added to the samples to obtain concentration levels of 1 ppm, 2 ppm, 3 ppm and 4 ppm limonene. For quantification, ion-93 acquired in SIM mode was used. Enrichment of the volatile fraction was carried out by headspace solid phase microextraction with a 2 cm stable flex 50/30 pm DVB/Carboxen/PDMS fibre at 60° C. for 20 minutes. Desorption was carried out directly in the heated injection port of a GCMS system at 270° C.

GCMS Parameters:

Column: 30 m HP 5 MS 0.25*0.25
Injector: Splitless with 0.75 mm SPME Liner, 270° C.
Temperature program: −10° C. (1 min)
MS: Single quadrupole, direct interface, 280° C. interface temperature Acquisition: SIM scan mode
Scan parameter: 20-300 amu
SIM Parameter: m/Z 93, 100 ms dwell time 2. Materials PE1 is HE6062, a black bimodal high density polyethylene jacketing compound for energy and communication cables (available from Borealis AG).

PE2 is HE6063, a natural bimodal high density polyethylene jacketing compound for energy and communication cables (available from Borealis AG).

Purpolen PE is a mixed-plastic-polyethylene primary recycling blend available from MTM plastics. Various samples of Purpolen PE, differing as to density and also rheology, were used in the present study, with the measured properties of these samples given in Table 1.

TABLE 1

Purpolen PE properties

| | Purpolen PE1 | Purpolen PE2 |
|---|---|---|
| C2 content (wt-%) | 87.42 | 74.22 |
| Isolated C3 content (wt.-%) | 0.17 | 0.32 |
| C4 content (wt-%) | 0.39 | 0.21 |
| C6 content (wt-%) | 0.48 | 0.18 |
| C7 content (wt.-%) | 0* | 0* |

TABLE 1-continued

Purpolen PE properties

| | Purpolen PE1 | Purpolen PE2 |
|---|---|---|
| Continuous C3 content (wt-%) | 11.53 | 25.07 |
| Limonene content (ppm) | 6 | n.m. |
| $MFR_2$ (g/10 min) | 0.80 | 0.91 |
| $MFR_5$ (g/10 min) | 3.55 | 4.23 |
| $MFR_{21}$ (g/10 min) | n.m. | 89.7 |
| Density (kg/m$^3$) | 983 | 951 |
| $W_{COP}$ | 67.5 | 46.9 |
| PI (s$^{-1}$) | 1.7 | 2.0 |
| $SHI_{2.7/210}$ | 40.3 | 45.7 |
| $eta_{0.05}$ (Pa·s) | 27600 | 30100 |
| $eta_{300}$ (Pa·s) | 560 | 560 |
| XHU (wt.-%) | 0.27 | 0.26 |
| Water content (%) | 262 | n.m. |

*0 means lower than the limit of quantification
n.m.-not measured

3. Experiments

Compositions were prepared via melt blending on a co-rotating twin screw extruder (ZSK) according to the recipes given in Table 2. The polymer melt mixture was discharged and pelletized. Table 2 further shows the content of these compositions, as measured by quantitative $^{13}C\{^1H\}$ NMR measurements. The mechanical properties of the compositions are given in Table 3.

TABLE 2

Composition of Comparative and Inventive Examples

| | CE1 | IE1 | CE0 | CE2 | CE3 | IE2 |
|---|---|---|---|---|---|---|
| PE1 (wt-%) | 100 | 75 | 50 | — | — | — |
| PE2 (wt-%) | — | — | — | 100 | 25.0 | 75.0 |
| Purpolen PE1 (wt-%) | — | 25 | 50 | — | — | — |
| Purpolen PE2 (wt-%) | — | — | — | — | 75 | 25 |
| CB content (wt-%) | 2.6 | 2.0 | 1.3 | 0** | 2.54* | 2.21* |
| C2 content (wt-%) | 97.8 | 94.4 | 91.8 | 97.6 | 80.5 | 92.3 |
| Isolated C3 content (wt-%) | 0** | 0** | 0** | 0** | 0.28 | 0** |
| C4 content (wt-%) | 2.23 | 2.04 | 1.26 | 2.42 | 0.83 | 1.87 |
| C6 content (wt-%) | 0** | 0** | 0** | 0** | 0.04 | 0** |
| C7 content (wt.-%) | 0** | 0** | 0** | 0** | 0** | 0** |
| Continuous C3 content (wt-%) | 0** | 3.6 | 6.9 | 0** | 18.3 | 5.82 |

*The carbon black in CE3 and IE2 results from the introduction of 6.3 wt-% of a 40% carbon black masterbatch in the melt blending step. The polyethylene as used as the carrier polyethylene has an $MFR_2$ of 12.1 g/10 min, an $MFR_5$ of 34.8 g/10 min, an $MFR_{21}$ of 312 g/10 min, a density of 963, $eta_{0.05}$ of 870 Pa·s, $eta_{300}$ of 291 Pa·s and a C4 content of <0.4 wt.-%.
**0 means lower than the limit of quantification

TABLE 3

Mechanical properties of Comparative and Inventive Examples

| | CE1 | IE1 | CE0 | CE2 | CE3 | IE2 |
|---|---|---|---|---|---|---|
| $MFR_2$ (g/10 min) | 0.48 | 0.48 | 0.51 | 0.46 | 0.87 | 0.60 |
| $MFR_5$ (g/10 min) | 1.82 | 2.01 | 2.34 | 1.79 | 3.32 | 2.55 |
| $MFR_{21}$ (g/10 min) | 37.6 | 45.2 | 48.2 | 34.7 | 76.3 | 49.6 |
| Density (kg/m$^3$) | 960 | 963 | 966 | 946 | 961 | 959 |
| Impact strength, 23° C., (kJ/m$^2$) | 13.1 | 9.3 | 4.7 | 14.3 | 3.0 | 6.0 |
| Impact strength, 0° C., (kJ/m$^2$) | 6.6 | 4.9 | 4.1 | 8.9 | 2.4 | 3.9 |
| $W_{COP}$ | 20.1 | 20.7 | 22.6 | 19.6 | 36.4 | 25.0 |
| PI (s$^{-1}$) | 1.9 | 2.1 | 2.3 | 2.0 | 2.1 | 2.0 |
| $SHI_{2.7/210}$ | 22.4 | 28.6 | 35.7 | 25.76 | 45.6 | 28.6 |
| $eta_{0.05}$ (Pa·s) | 25900 | 26400 | 28300 | 26200 | 30600 | 24000 |
| $eta_{300}$ (Pa·s) | 800 | 730 | 670 | 760 | 600 | 690 |
| Bell ESCR (h) | >4000 | >4000 | 840 | >4000 | 0 | >4000 |
| Cable shrinkage (%) | 0.92 | 1.11 | 1.08 | 0.35 | 0.63 | 0.62 |
| Pressure deformation (%) | 7 | 6 | 5 | 5 | n.m. | n.m. |
| SH modulus (MPa) | 24.4 | 19.5 | 16.2 | 27.6 | —* | 19.9 |
| Shore D 15 s (ISO 868) | 60.7 | 61.3 | 61.1 | 59.2 | n.m. | n.m. |

TABLE 3-continued

Mechanical properties of Comparative and Inventive Examples

|  | CE1 | IE1 | CE0 | CE2 | CE3 | IE2 |
|---|---|---|---|---|---|---|
| Shore D 3 s (ISO 868) | 62.8 | 63.3 | 63.4 | 62.9 | n.m. | n.m. |
| Shore D 1 s (ISO 868) | 64.1 | 64.4 | 64.5 | 61.5 | n.m. | n.m. |
| Tensile strain at break, 5A specimen (%) | 820 | 600 | 400 | 880 | 16 | 470 |
| Tensile stress at break, 5A specimen (MPa) | 28 | 17 | 14 | 33 | 20 | 15 |
| Tear resistance (N/mm) | 25.9 | 23.5 | 22.8 | 17.2 | n.m. | n.m. |
| Water content (%) | 262 | 208 | 179 | 33 | 138 | 79 | n.m.-not measured
*not measurable

Addition of relatively low amounts virgin materials lead to a pronounced improvement as to ESCR properties. Thus, those compositions according to the present invention have sufficiently high ESCR and good mechanical properties. Furthermore, the inclusion of recycled material means the inventive compositions conform to the ever-stricter requirements regarding recycled material content. It can be seen that examples IE1 and IE2 both having a C4 content of 2.04 and 1.87 wt.-%, i.e. within the range of 1.75 to 2.25 wt.-% as claimed surprisingly had significantly better Bell ESCR, better impact strength (23° C.), comparable impact strength (0° C.), and better tensile properties.

The invention claimed is:

1. A mixed-plastic-polyethylene composition having
a melt flow rate (ISO 1133, 2.16 kg, 190° C.) of from 0.1 to 0.9 g/10 min;
a density of from 956 kg/m$^3$ to 970 kg/m$^3$,
the mixed-plastic-polyethylene composition comprising
a total amount of ethylene units (C2 units) of from 87.0 to 97.0 wt.-%, and
a total amount of continuous units having 3 carbon atoms corresponding to polypropylene (continuous C3 units) of from 1.0 to 12.0 wt.-%,
a total amount of units having 4 carbon atoms (C4 units) of from 1.75 wt.-% to 2.25 wt.-%,
with the total amounts of C2 units, continuous C3 units and units having 4 carbon atoms being based on the total weight amount of monomer units in the composition and measured according to quantitative $^{13}C\{^1H\}$ NMR measurement;
wherein the mixed-plastic-polyethylene composition comprises a mixed-plastic polyethylene primary recycling blend (A), and
wherein the mixed-plastic-polyethylene composition is obtained by blending and extruding
a. 5.0 to 35.0 wt.-% of a mixed-plastic-polyethylene primary recycling blend (A) wherein at least 90.0 wt.-% of the mixed-plastic-polyethylene primary blend (A) originates from post-consumer waste having a limonene content of from 0.10 to 500 ppm; and wherein the mixed-plastic-polyethylene primary blend (A) has
a melt flow rate (ISO 1133, 2.16 kg, 190° C.) of from 0.1 to 1.5 g/10 min;
a density of from 945 to 990 kg/m$^3$;
optionally a shear thinning index $SHI_{2.7/2.10}$ of 30 to 60; and
a content of units derived from ethylene of 70.0 to 95.0 wt.-% as determined by quantitative $^{13}C\{^1H\}$-NMR;
b. 65.0 to 95.0 wt.-% of a secondary component (B) being a virgin high-density polyethylene (HDPE) optionally blended with carbon black, the secondary component (B) having
a melt flow rate (ISO 1133, 2.16 kg, 190° C.) of from 0.1 to 1.2 g/10 min;
a density of from 940 to 970 kg/m$^3$;
a shear thinning index $SHI_{2.7/210}$ of 15 to 30;
a polydispersity index from 1.6 to 2.2 as obtained from rheological measurement;
optionally a carbon black content of 1.5 to 3.0 wt.-% with respect to the secondary component (B); and
a limonene content below 0.10 ppm.

2. A mixed-plastic-polyethylene composition according to claim 1 having
a melt flow rate (ISO 1133, 2.16 kg, 190° C.) of from 0.1 to 0.9 g/10 min;
a density of from 956 to 968 kg/m$^3$;
the mixed-plastic-polyethylene composition comprising
a total amount of ethylene units (C2 units) of from 90.0 to 96.0 wt.-%, and
a total amount of continuous units having 3 carbon atoms corresponding to polypropylene (continuous C3 units) of from 2.5 to 7.0 wt.-%,
a total amount of units having 4 carbon atoms (C4 units) of from 1.75 wt.-% to 2.15 wt.-%;
with the total amounts of C2 units, continuous C3 units and units having 4 carbon atoms being based on the total weight amount of monomer units in the composition and measured according to quantitative $^{13}C\{^1H\}$ NMR measurement.

3. The mixed-plastic-polyethylene composition of claim 1 comprising carbon black in an amount of 1.0 to 3.0 wt.-% with respect to the total of the mixed-plastic-polyethylene composition.

4. The mixed-plastic-polyethylene composition according to claim 1 comprising:
one or more in any combination of:
a total amount of units having 3 carbon atoms as isolated peaks in the NMR spectrum (isolated C3 units) of from 0.00 wt.-% to 0.20 wt.-%;
a total amount of units having 6 carbon atoms (C6 units) of from 0.00 wt.-% to 0.10 wt.-%;
a total amount of units having 7 carbon atoms (C7 units) of from 0.00 wt.-% to 0.20 wt.-%;
wherein the total amounts of isolated C3 units, C4 units, C6 units, C7 units are based on the total weight amount of monomer units in the composition and are measured or calculated according to quantitative $^{13}C\{^1H\}$ NMR measurement.

5. The mixed-plastic-polyethylene composition according to claim 1, wherein the mixed-plastic-polyethylene primary recycling blend (A) has
an ESCR (Bell test failure time) of less than 1000 hours; and optionally includes TiO$_2$ in an amount of up to 3.0 wt.-% with respect to mixed-plastic-polyethylene primary recycling blend (A).

6. The mixed-plastic-polyethylene composition according to claim 1, wherein the secondary component (B) has an ESCR (Bell test failure time) of at least 2500 hours.

7. The mixed-plastic-polyethylene composition according to claim 1, wherein the content of carbon black is from 1.8 to 2.8 wt.-%.

8. The mixed-plastic-polyethylene composition according to claim 1, wherein the composition has an ESCR (Bell test failure time) of at least 1000 hours.

9. The mixed-plastic-polyethylene composition according to claim 1, wherein
the impact strength at 23° C. (according to ISO 179-1 eA) is from 3.0 to 15.0 kJ/m$^2$ and/or
wherein the impact strength at 0° C. (according to ISO 179-1 eA) is from 2.0 to 10.0 kJ/m$^2$.

10. The mixed-plastic-polyethylene composition according to claim 1, wherein the strain hardening modulus (SH modulus) is from 15.0 to 24.0 MPa.

11. The mixed-plastic-polyethylene composition according to claim 1 having
i. a melt flow rate (ISO 1133, 2.16 kg, 190° C.) of from 0.3 to 0.7 g/10 min, and/or
ii. a melt flow rate (ISO 1133, 5 kg, 190° C.) of from 1.7 to 2.7 g/10 min, and/or
iii. a melt flow rate (ISO 1133, 21 kg, 190° C.) of from 40.0 to 55.0 g/10 min.

12. The mixed-plastic-polyethylene composition according to claim 1, wherein the $SHI_{2.7/210}$ is between 25.0 and 40.0.

13. The mixed-plastic-polyethylene composition according to claim 1, wherein the composition is characterized in that a compression moulded plaque made from the composition having 1 mm thickness has a tear resistance of at least 23.0 N/mm and optionally up to 30.0 N/mm.

14. An article comprising the mixed-plastic-polyethylene composition according to claim 1.

15. A process for preparing the mixed-plastic-polyethylene composition according to claim 1, comprising:
a. providing a mixed-plastic-polyethylene primary recycling blend (A) in an amount of 5.0 to 35.0 wt.-%, based on the overall weight of the composition,
wherein at least 90 wt.-% of the mixed-plastic-polyethylene primary blend (A) originates from post-consumer waste having a limonene content of from 0.10 to 500 ppm and wherein the mixed-plastic-polyethylene primary blend has:
a melt flow rate (ISO 1133, 2.16 kg, 190° C.) of from 0.1 to 1.50 g/10 min;
a density of from 945 to 990 kg/m$^3$;
optionally a shear thinning index $SHI_{2.7/2.10}$ of 30 to 60;
optionally a polydispersity index from 1.5 to 2.5 s$^{-1}$; and
a content of units derived from ethylene of 70.0 to 95.0 wt.-% as determined by quantitative $^{13}C\{^1H\}$-NMR;
b. providing a secondary component (B) being a virgin high-density polyethylene (HDPE) optionally blended with carbon black, in an amount of 65.0 to 95.0 wt.-%, based on the overall weight of the composition, the secondary component (B) having
a melt flow rate (ISO 1133, 2.16 kg, 190° C.) of from 0.1 to 1.2 g/10 min;
a density of from 940 to 970 kg/m$^3$;
a shear thinning index $SHI_{2.7/210}$ of 15 to 30;
a polydispersity index from 1.6 to 2.2 s$^{-1}$ as obtained from rheological measurement;
optionally a carbon black content of 1.5 to 3.0 wt.-% with respect to the secondary component,
a limonene content below 0.10 ppm,
c. melting and mixing the blend of mixed-plastic-polyethylene primary blend (A) and the secondary component (B) in an extruder, optionally a twin screw extruder, and
d. optionally pelletizing the obtained mixed-plastic-polyethylene composition.

16. The article of claim 14, wherein the article is a cable jacket.

* * * * *